United States Patent Office 3,455,695
Patented July 15, 1969

3,455,695
PHOTOGRAPHIC MATERIALS FOR THE SILVER
DYESTUFF BLEACHING PROCESS
Bernhard Piller, Marly-le-Petit, Switzerland, assignor to
Ciba Limited, Basel, Switzerland, a Swiss company
No Drawing. Filed Feb. 15, 1966, Ser. No. 527,495
Claims priority, application Switzerland, Feb. 22, 1965,
2,426/65
Int. Cl. G03c 1/10
U.S. Cl. 96—99        6 Claims

ABSTRACT OF THE DISCLOSURE

The present invention provides photographic materials for the silver dye bleaching process comprising a support carrying a layer containing a silver halide emulsion and a dyestuff. The dyestuff corresponds to the formula

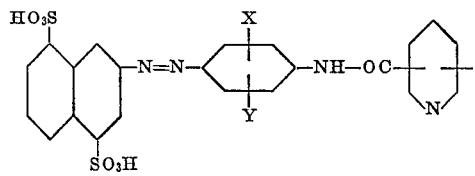

where X represents a hydrogen or halogen atom, or an alkyl, alkoxy, hydroxyalkoxy, alkoxyalkoxy or acylamino group, and Y represents a hydrogen atom, an alkyl or an alkoxy group. These dyestuffs are fast to diffusion and light and are easily reduced in the dye bleaching bath. The resulting positive images are fast to light and of the permanence required for documents.

---

The present invention provides photographic materials for the silver dye bleaching process comprising a support carrying a layer containing a dyestuff of the formula (1)

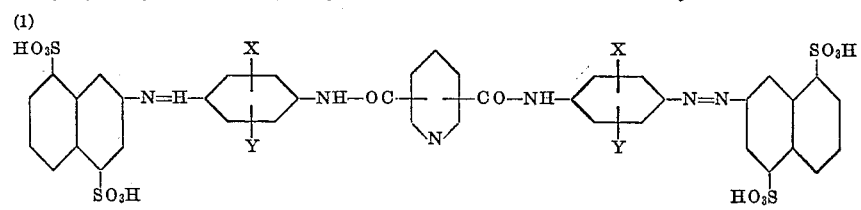

where X represents a hydrogen or halogen atom, or an alkyl, alkoxy, hydroxyalkoxy, alkoxyalkoxy or acylamino group, and Y represents a hydrogen atom, an alkyl group or an alkoxy group.

Preferred dyestuffs are those of the formula (2)

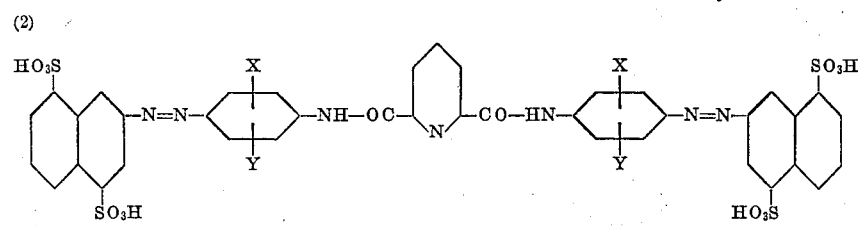

where X and Y have the meanings given above.

The dyestuffs of the Formula 1 may be obtained by reacting a dihalide of a pyridine dicarboxylic acid in a molecular ratio of 1:2 with an aminoazo dyestuff of the formula (3)

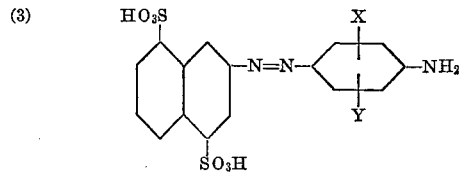

where X and Y have the meanings defined above. It is advantageous to carry out this reaction with a pyridine dicarboxylic acid dichloride, for example with the dichloride of pyridine-2,5-dicarboxylic acid, pyridine-3,5-dicarboxylic acid or especially pyridine-2,6-dicarboxylic acid. The aminoazo dyestuffs of the Formula 3 may be obtained by coupling diazotized 2-aminonaphthalene-4,8-disulphonic acid with an aminobenzene which may contain the substituents X and Y defined above. These substituents advantageously contain no more than 4 carbon atoms each. As examples of such coupling components the following may be mentioned: 1-amino-2- or -3-methylbenzene, 1-amino-2,5- or -2,6-dimethylbenzene, 1-amino-2- or -3-methoxybenzene, 1-amino-2-ethoxybenzene, 1-amino-2-$\beta$-hydroxyethoxybenzene, 1-amino-2-$\beta$-methoxyethoxy-5-methylbenezene, 1-amino-3-acetylaminobenzene, 1-amino-2-methoxy-5-methylbenzene, 1-amino-3-chlorobenzene, 1-amino-3-methoxymethoxybenzene, 1-amino-2,5-dimethoxybenzene and 1-amino-2,5-diamethoxybenzene.

Other wise, the dyestuffs of the Formulae 1, 2 and 3 may be manufactured by any known method. The coupling to form the aminoazo dyestuffs is carried out in an acid medium. Amines that are difficult to couple may be coupled in the form of their $\omega$-methanesulfonic acids, followed by elimination of the methanesulfonic acid group.

The aminoazo dyestuffs may be reacted, for example, with the pyridine dicarboxylic acid halide in the presence of an acid-binding agent.

Like the dyestuffs themselves the photographic layers, which according to this invention contain at least one dyestuff of the Formula 1, can be prepared by known methods and used for the production of color images. More especially, the dyestuffs of the Formula 1 may be incorporated in a multi-layer material comprising on a support layer a layer dyed with a cyan dye and selectively sensitized to red, covered by a layer dyed magenta and selectively sensitized to green and finally a layer dyed with a dyestuff of the Formula 1 and sensitized to blue.

In general, the dyestuffs of the Formula 1 are very fast to diffusion in the conventional layers. After drying and storing they do not tend to become opalescent to turbid in the gelatin layers and are easily reduced in the dye bleaching bath to harmless and/or easily washed out scission products.

The parts and percentages in the following examples are by weight.

Example 1

1.68 ml. of 1% aqueous solution of the dyestuff of the formula (4)
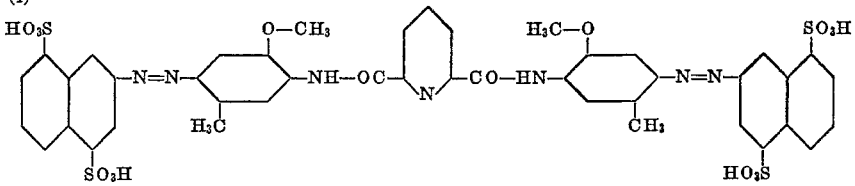
Absorption maximum in water at λ=338 mμ are added at 40° C. to 3.3 ml. of 6% aqueous gelatin. There are then added 3.3 ml. of a gelatin silver bromide emulsion heated at 40° C. and, if desired or required, 1 to 2 ml. of an aqueous solution of a spreading agent, for example saponin, and of a curing agent, for example di-methylolurea. This mixture is poured over a plate of glass measuring 13 x 18 cm. and dried.

The plate is then exposed behind a step wedge, and the silver image is developed in a 1-methylamino-4-hydroxybenzene-sulfonatehydroquinone developer and fixed.

The image dye is then bleached imagewise according to the amount of silver present, in a bath containing in 1,000 parts by volume 30 to 100 parts by volume of 32% hydrochloric acid, 40 to 120 parts of potassium bromide, 30 to 50 parts of thiourea and 0.001 to 0.01 part of 2-amino-3-hydroxyphenazine.

The plate is subjected to an intermediate rinse, and the excess silver is washed out in a bath containing in 1,000 parts by volume 100 parts of sodium chloride, 100 parts of crystalline copper sulfate and 50 parts by volume of 37% hydrochloric acid. Finally, the plate is fixed in the usual manner. A yellow color wedge is obtained which is opposite to the original silver wedge and is completely bleached out in the areas of the greatest initial silver density. Such a yellow image may also be part of a multi-layer color material.

Similar results are obtained by using instead of the dyestuff of the Formula 4 any one of the dyestuffs of the following Formulae 5 to 13:

(5)
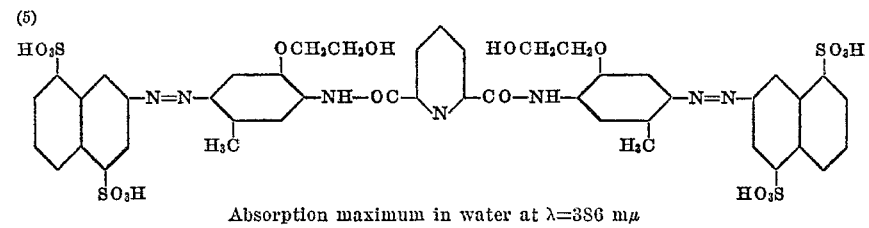
Absorption maximum in water at λ=386 mμ

(6)
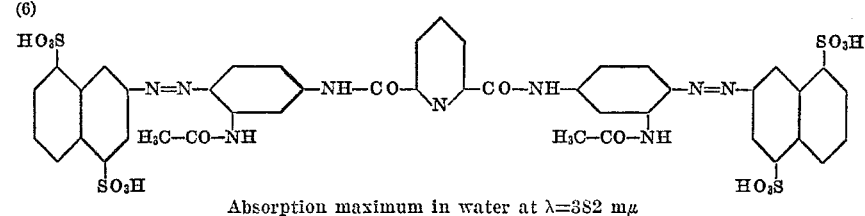
Absorption maximum in water at λ=382 mμ

(7)
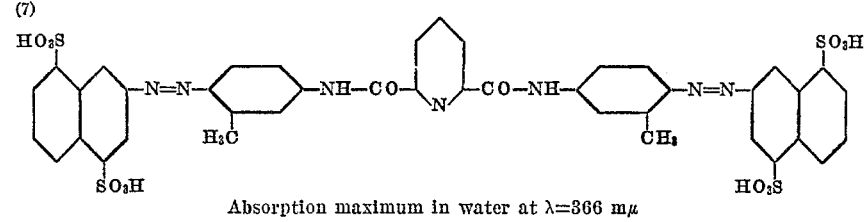
Absorption maximum in water at λ=366 mμ

(8)
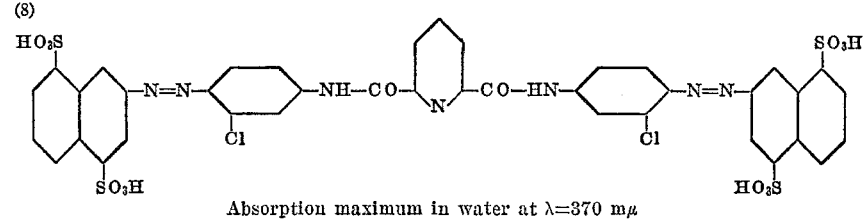
Absorption maximum in water at λ=370 mμ

(9)
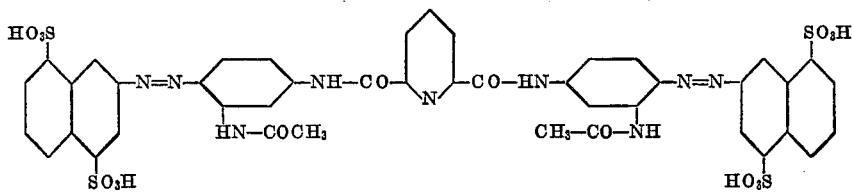
Absorption maximum in water at λ=390 mµ

(10)
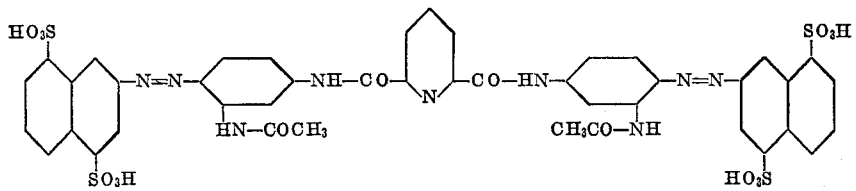
Absorption maximum in water at λ=392 mµ

(11)
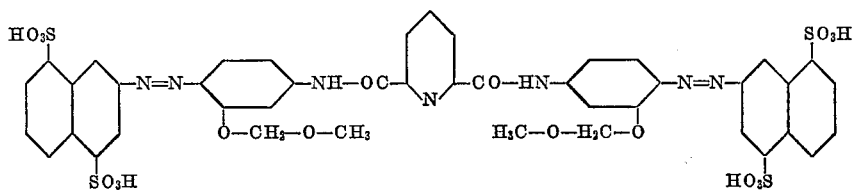
Absorption maximum in water at λ=390 mµ

(12)
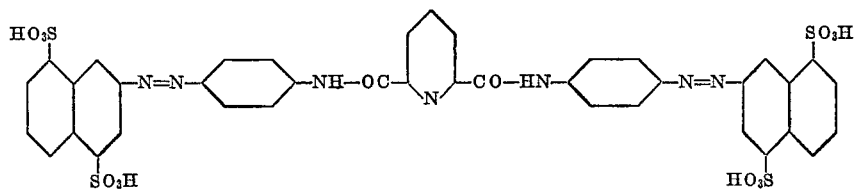
Absorption maximum in water at λ=362 mµ

(13)
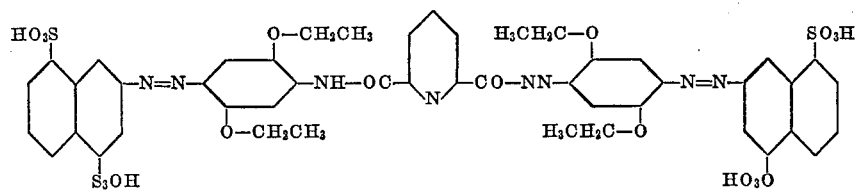
Absorption maximum in water at λ=424 mµ

The dyestuff of the Formula 4 may be prepared in the following manner:

A solution of 60.6 parts of sodium 2-aminonaphthalene 4.8-disulfonate in 1.000 part of water is cooled with ice to 0° C. and then diazotized in the usual manner with 65 parts of 37% hydrochloric acid and 14 parts of sodium nitrite. A solution of 30.5 parts of 2-methoxy-5-methyl-1-aminobenzene in 300 parts of water and 30 parts of 37% hydrochloric acid, prepared at 60 to 70° C., is cooled with ice to 5° C. and coupled with the solution of the diazo compound. After stirring for 24 hours at 8 to 15° C. the coupling to form the aminomonoazo dyestuff is complete. The acid suspension is heated to 65° C. and then filtered at 30° C.

9 parts of the aminomonoazo dyestuff obtained in this manner are dissolved in 75 parts of water at pH=9. 2 parts of pyridine-2,6-dicarboxylic acid dichloride are dissolved by heating in 20 parts by volume of acetone and this solution is added in portions at pH=8.5 to 9.5 to the solution of the aminomonoazo dyestuff. The batch is stirred for 1 hour at room temperature at pH 9.0 to 9.5 and then for 12 to 14 hours at pH 10.0 and the precipitated dyestuff is then suction filtered.

For purification the dyestuff is dissolved in 250 parts of water and the requisite quantity of 0.1 N sodium hydroxide solution, precipitated by adding 25 parts by volume of a 2:1-mixture of ethanol and 50% potassium acetate solution, suction-filtered and freed from by-products by washing with ethanol. The yield of dry dyestuff amounts to about 70%.

Example 2

The following layers are produced successively on a white opaque acetate film provided with an adhesive coating:

(1) Red-sensitive silver bromide emulsion in gelatin, containing the cyan dyestuff of the formula (7)
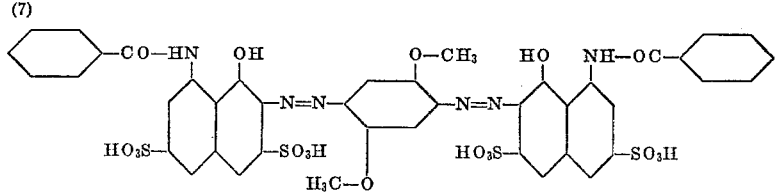

(2) Colorless gelatin layer without silver halide;
(3) Green-sinsitive silver bromide emulsion in gelatin, containing the magenta dyestuff of the formula (8)
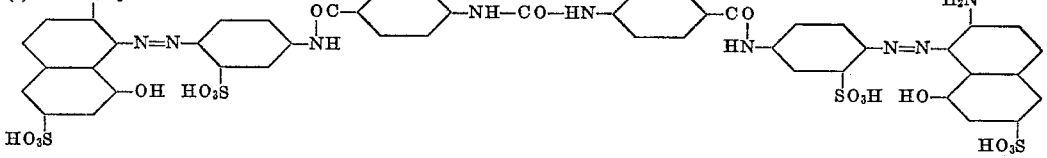

(4) Yellow layer, containing the dyestuff of the formula

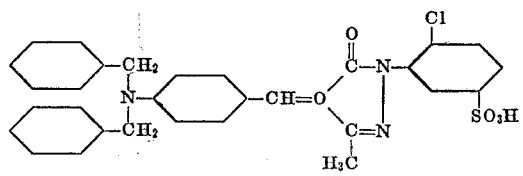

(5) Blue-sensitive silver bromide emulsion in gelatin, containing the yellow dyestuff of one of the Formulae 4 to 13.

The gelatin layers may contain conventional additives, e.g. wetting agents, hardeners and stabilizers for the silver halide. Each layer in general contains, per square meter of film, 0.5 g. of the dyestuff concerned and silver bromide in an amount corresponding to 1 to 1.2 g. of silver.

The film thus prepared is exposed under a color transparency to red, green and blue printing light, and the print is then developed through the following stages:

(1) Developing for 6 minutes in a bath containing per liter of water 50 g. of anhydrous sodium sulfite, 0.2 g. of 1-phenyl-3-pyrazolidone, 6 g. of hydroquinone, 35 g. of anhydrous sodium carbonate, 4 g. of potassium bromide and 0.3 g. of benztriazole;

(2) Rinsing for 5 minutes;
(3) Fixing for 6 minutes in a solution of 200 g. of crystalline sodium thiosulfate and 20 g. of potassium metabisulfite in 1 liter of water;
(4) Rinsing for 5 minutes;
(5) Dye-bleaching for 3 to 12 minutes in a solution containing per liter of water 50 to 80 g. of potassium bromide, 40 to 80 g. of thiourea, 35 to 80 g. of 30% sulfuric acid and, if desired, 0.01 g. of 2-amino-3-hydroxyphenazine;

(6) Rinsing for 10 minutes;
(7) Bleaching out the residual silver for 5 minutes with a solution of 60 g. of crystalline copper sulfate, 80 g. of potassium bromide and 15 ml. of 30% hydrochloric acid per liter of water;
(8) Rinsing for 5 minutes;
(9) Fixing for 5 minutes as described above under 3, and
(10) Rinsing for 5 minutes.

The resulting positive image for viewing in reflected light is fast to light and of the permanence required for documents.

What is claimed is:
1. Photographic material for the silver dye bleaching process, which comprises on a support a layer containing a silver halide emulsion and at least one dyestuff of the formula

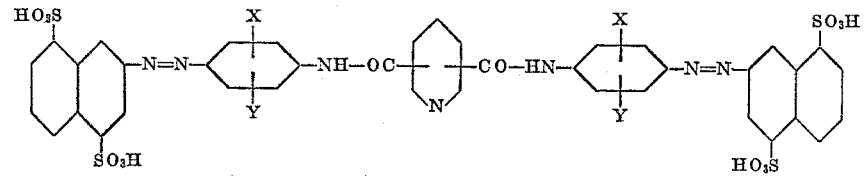

where X represents a member selected from the group consisting of a hydrogen atom, a halogen atom, an alkyl group, an alkoxy group, an alkoxyalkoxy group and an acylamino group and Y represents a member selected from the group consisting of a hydrogen atom, and alkyl group and a alkoxy group.

2. Photographic material as claimed in claim 1 for the silver dye bleaching process, which comprises on a support a layer containing a silver halide emulsion and at least one dyestuff of the formula

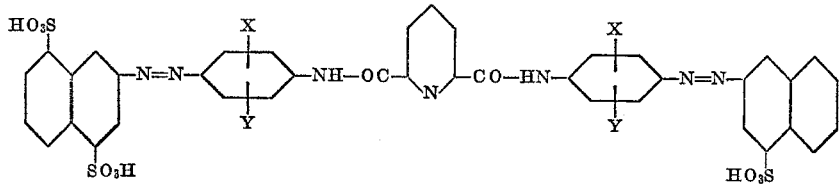

where X represents a member selected from the group consisting of a hydrogen atom, a halogen atom, an alkyl group, an alkoxy group, an alkoxyalkoxy group and an acylamino group and Y represents a member selected from the group consisting of a hydrogen atom, an alkyl group and an alkoxy group.

3. Photographic material as claimed in claim 1 for the silver dye bleaching process, which comprises on a support a layer containing a silver halide emulsion and at least one dyestuff of the formula

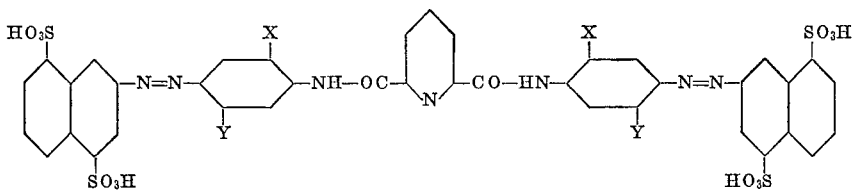

where X represents a member selected from the group consisting of a hydrogen atom, a halogen atom, an alkyl group, an alkoxy group, an alkoxyalkoxy group and an acylamino group and Y represents a member selected from the group consisting of a hydrogen atom, an alkyl group and an alkoxy group.

4. Photographic material as claimed in claim 1, wherein the layer contains a silver halide emulsion and the dyestuff of the formula

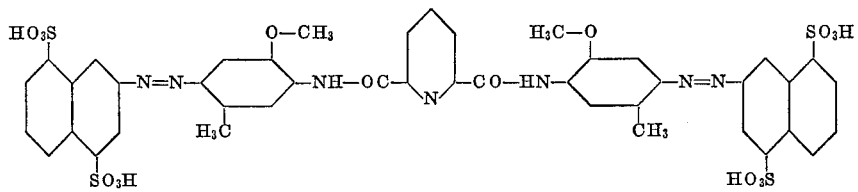

5. Photographic material as claimed in claim 1, wherein the layer contains a silver halide emulsion and the dyestuff of the formula

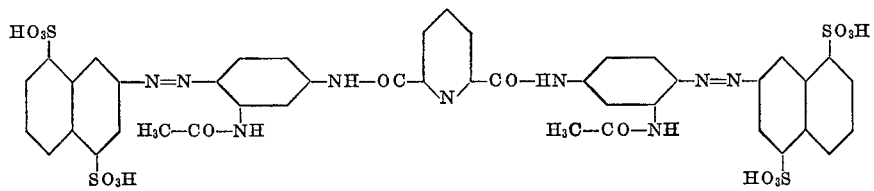

6. Photographic material as claimed in claim 1, wherein the layer contains a silver halide emulsion and the dyestuff of the formula

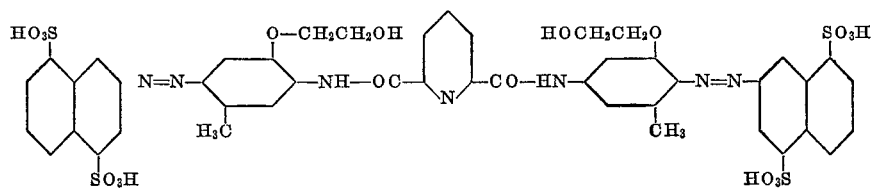

References Cited
UNITED STATES PATENTS 2,899,305   8/1959   Bossard et al. _____ 96—99
3,264,109   8/1966   Anderau _____ 96—99

J. TRAVIS BROWN, Primary Examiner

U.S. Cl. X.R.
96—20, 53, 73